United States Patent
Mont-Reynaud

(10) Patent No.: US 11,295,741 B2
(45) Date of Patent: Apr. 5, 2022

(54) DYNAMIC WAKEWORDS FOR SPEECH-ENABLED DEVICES

(71) Applicant: SoundHound, Inc., Santa Clara, CA (US)

(72) Inventor: Bernard Mont-Reynaud, Sunnyvale, CA (US)

(73) Assignee: SoundHound, Inc., Santa Clara, CA (US)

(*) Notice: Subject to any disclaimer, the term of this patent is extended or adjusted under 35 U.S.C. 154(b) by 320 days.

(21) Appl. No.: 16/704,944

(22) Filed: Dec. 5, 2019

(65) Prior Publication Data

US 2021/0174794 A1 Jun. 10, 2021

(51) Int. Cl.
| | | |
|---|---|---|
| *G10L 15/22* | (2006.01) | |
| *G06F 3/16* | (2006.01) | |
| *G10L 15/06* | (2013.01) | |
| *G10L 15/08* | (2006.01) | |
| *G10L 17/04* | (2013.01) | |

(52) U.S. Cl.
CPC .............. *G10L 15/22* (2013.01); *G06F 3/167* (2013.01); *G10L 15/063* (2013.01); *G10L 15/08* (2013.01); *G10L 17/04* (2013.01); *G10L 2015/088* (2013.01); *G10L 2015/223* (2013.01)

(58) Field of Classification Search
CPC ....... G10L 15/22; G10L 15/063; G10L 15/08; G10L 17/04; G10L 2015/088; G10L 2015/223; G06F 3/167
See application file for complete search history.

(56) References Cited

U.S. PATENT DOCUMENTS

| 7,720,683 B1 | 5/2010 | Vermeulen |
|---|---|---|
| 8,452,597 B2 | 5/2013 | Bringert |
| 9,117,449 B2 | 8/2015 | Newman |

(Continued)

FOREIGN PATENT DOCUMENTS

| CN | 104575504 A | 4/2015 |
|---|---|---|
| CN | 105575395 A | 5/2016 |

(Continued)

OTHER PUBLICATIONS

Mycroft.ai, Mycroft.ai Documentation, Mycroft.ai, on or before Mar. 15, 2019, https://mycroft.ai/documentation/home-mycroft-ai-pairing/#changing-your-wake-word.

(Continued)

*Primary Examiner* — Michael Colucci
(74) *Attorney, Agent, or Firm* — Vierra Magen Marcus LLP

(57) ABSTRACT

A system and method are disclosed capable of parsing a spoken utterance into a natural language request and a speech audio segment, where the natural language request directs the system to use the speech audio segment as a new wakeword. In response to this wakeword assignment directive, the system and method are further capable of immediately building a new wakeword spotter to activate the device upon matching the new wakeword in the input audio. Different approaches to promptly building a new wakeword spotter are described. Variations of wakeword assignment directives can make the new wakeword public or private. They can also add the new wakeword to earlier wakewords, or replace earlier wakewords.

34 Claims, 8 Drawing Sheets

(56) References Cited

U.S. PATENT DOCUMENTS

| | | | |
|---|---|---|---|
| 9,275,637 | B1 | 3/2016 | Salvador |
| 9,373,321 | B2 | 6/2016 | Bapat |
| 9,697,828 | B1* | 7/2017 | Prasad .................. G10L 15/18 |
| 9,870,521 | B1* | 1/2018 | Solh .................. G06K 9/00335 |
| 10,102,858 | B1 | 10/2018 | Boss |
| 10,217,453 | B2 | 2/2019 | Stevans et al. |
| 10,796,563 | B1* | 10/2020 | Bell ..................... G04G 21/04 |
| 10,991,364 | B1* | 4/2021 | Hoover ............... G10L 15/1815 |
| 2017/0242657 | A1* | 8/2017 | Jarvis ..................... G10L 17/00 |
| 2018/0108343 | A1 | 4/2018 | Stevans |
| 2019/0005954 | A1* | 1/2019 | Xie ..................... G10L 15/063 |
| 2019/0066680 | A1 | 2/2019 | Woo |
| 2019/0149987 | A1* | 5/2019 | Moore .................... G06F 3/167 726/9 |
| 2020/0302913 | A1* | 9/2020 | Marcinkiewicz ....... G10L 15/02 |
| 2021/0020162 | A1* | 1/2021 | Griffin ................ G10L 15/063 |
| 2021/0065699 | A1* | 3/2021 | Kaushik ................. G10L 15/16 |
| 2021/0366473 | A1* | 11/2021 | Maeng .................. G10L 15/22 |

FOREIGN PATENT DOCUMENTS

| | | |
|---|---|---|
| CN | 106098059 A | 11/2016 |
| CN | 109767763 | 5/2019 |
| CN | 109887505 | 6/2019 |
| EP | 3353677 | 8/2018 |

OTHER PUBLICATIONS

Mycroft.ai, Mycroft.ai Documentation, Mycroft.ai, on or before Mar. 15, 2019, https://mycroft-ai.gitbook.io/docs/using-mycroft-ai/customizations/mycroft-conf.

Jingyong Hou, Investigating neural network based query-by-example keyword spotting approach for personalized wake-up word detection in Mandarin Chinese. In2016 10th international symposium on Chinese spoken language processing (ISCSLP) Oct. 17, 2016 (pp. 1-5). IEEE.

Mycroft.ai, Mycroft.ai Documentation, Mycroft.ai, on or before Apr. 19, 2019, https://mycroft.ai/documentation/precise/.

Anonymous, Alexa is a human, My letter to Amazon, on or before Jul. 7, 2019, https://alexaisahuman.com/my-letter-to-amazon.

Zhehuai Chen, End-to-end contextual speech recognition using class language models and a token passing decoder. InICASSP 2019-2019 IEEE International Conference on Acoustics, Speech and Signal Processing (ICASSP) May 1, 20192 (pp. 6186-6190). IEEE.

David B. Ramsay, Low-Dimensional Bottleneck Features for On-Device Continuous Speech Recognition. arXiv preprint arXiv:1811.00006. Oct. 31, 2018.

English language Abstract for CN104575504 published Apr. 29, 2015.

English language Abstract for CN105575395 published May 11, 2016.

English language Abstract for CN106098059 published Nov. 9, 2016.

European Search Report dated Apr. 27, 2021 in European Patent Application No. EP20211708.1.

English language Abstract for CN109887505 published Jun. 14, 2019.

English language Abstract for CN 109767763 published May 17, 2019.

\* cited by examiner

Fig. 8

Segmentation 1:   Segment A
                  $\overbrace{\text{HH EY1 K R IH1 S T AH0 F ER0}}$
                  *(Hey Christopher)*

Segmentation 2:   Seg. A        Seg. B
                  $\overbrace{\text{HH EY1}}$   $\overbrace{\text{K R IH1 S T AH0 F ER0}}$
                  *(Hey)*        *(Christopher)*

Segmentation 3:   Seg. A    Seg. B      Seg. C    Seg. D
                  $\overbrace{\text{HH EY1}}$   $\overbrace{\text{K R IH1 S}}$   $\overbrace{\text{T AH0}}$   $\overbrace{\text{F ER0}}$
                  *(Hey)*    *(Chris)*    *(to)*    *(pher)*

DYNAMIC WAKEWORDS FOR SPEECH-ENABLED DEVICES

FIELD

The present technology relates to wakewords for speech-enabled devices, and in particular, to assigning dynamic wakewords using natural language queries, and immediately building wakeword spotters for the wakewords for one or more of a user's speech-enabled devices.

BACKGROUND

Automatic speech recognition (ASR) systems that recognize human speech, together with natural language understanding (NLU) capabilities that extract the meaning of the speech, offer tremendous potential as an easy and natural way to interface with speech-enabled devices. Such systems are enabled in part by the vast computational and communication resources available in modern devices. Advanced speech understanding systems such as virtual assistants have been developed, which are able to recognize a wide range of speech and process complex requests in different languages and dialects.

Virtual assistants do not respond to spoken requests when idle. They wake up or activate, and switch state from idle to active, upon receiving an activation signal, such as a tap, button push, or a spoken activation phrase, referred to as a wakeword (or wakephrase). The use of wakewords is key to hands-free and eye-free operation of speech-enabled devices. In the active state, virtual assistants respond to user requests. They typically return to the idle state after responding to a request. When idle, speech-enabled devices continuously monitor the incoming audio to detect a wakeword. In order to reduce power consumption, some devices may operate in a low power mode when the virtual assistant is idle; they return to full power mode when activated.

A wakeword is typically a word or a short phrase. The continuously operating module that monitors the incoming audio to detect a wakeword is called a wakeword spotter. Various commercial implementations of wakewords for speech-enabled devices include, "Hey, Siri", "OK, Google", and "Alexa". Speech-enabled devices may be sold with factory installed wakewords, and wakeword spotters ready to detect the predefined wakewords.

A wakeword spotter is an audio processing algorithm specifically designed to detect an assigned wakeword, or a set of assigned wakewords, in a continuous audio stream. The algorithm runs continuously, usually at a fixed frame rate, and it must be highly efficient. On a device in low power mode, a spotter is able to run continuously without drawing excessive power, saving battery life.

There are times when it may be desirable to customize the factory-installed wakeword on one or more speech-enabled devices. For example, in a home or office setting, there may be several devices using the same factory-installed wakeword as the activation phrase. This can result in the wrong device activating, or in collisions where multiple devices activate upon sensing a common wakeword. Multiple device activations can lead to a range of problems depending on the type of request following the wakeword. For example, a request to play music can result in multiple devices playing the same song (out of sync), or different songs, simultaneously. A request to send a message may result in multiple copies of the message being sent. These and other collision scenarios lead to poor user experiences.

The key challenge when providing dynamic wakewords is training a new wakeword spotter in a very short amount of time. Factory-installed wakeword spotters are generally trained using large datasets of audio samples, including positive instances specifically recorded for one or more given wakewords, and possibly some negative instances. Such labeled samples are used to train a classifier algorithm, such as a recurrent neural network, to distinguish the given wakeword (or wakewords) from non-wakeword speech in an audio stream. Unfortunately, the traditional approach to collecting audio sample data is not available for dynamic wakewords, which require a spotter to be built immediately, without the benefit of collecting a large dataset of audio samples of the dynamic wakeword.

DESCRIPTION OF THE DRAWINGS

FIG. 8 is an illustration of the wakeword segmentation approach to the processing of a dynamic wakeword.

DETAILED DESCRIPTION

Figure 1:
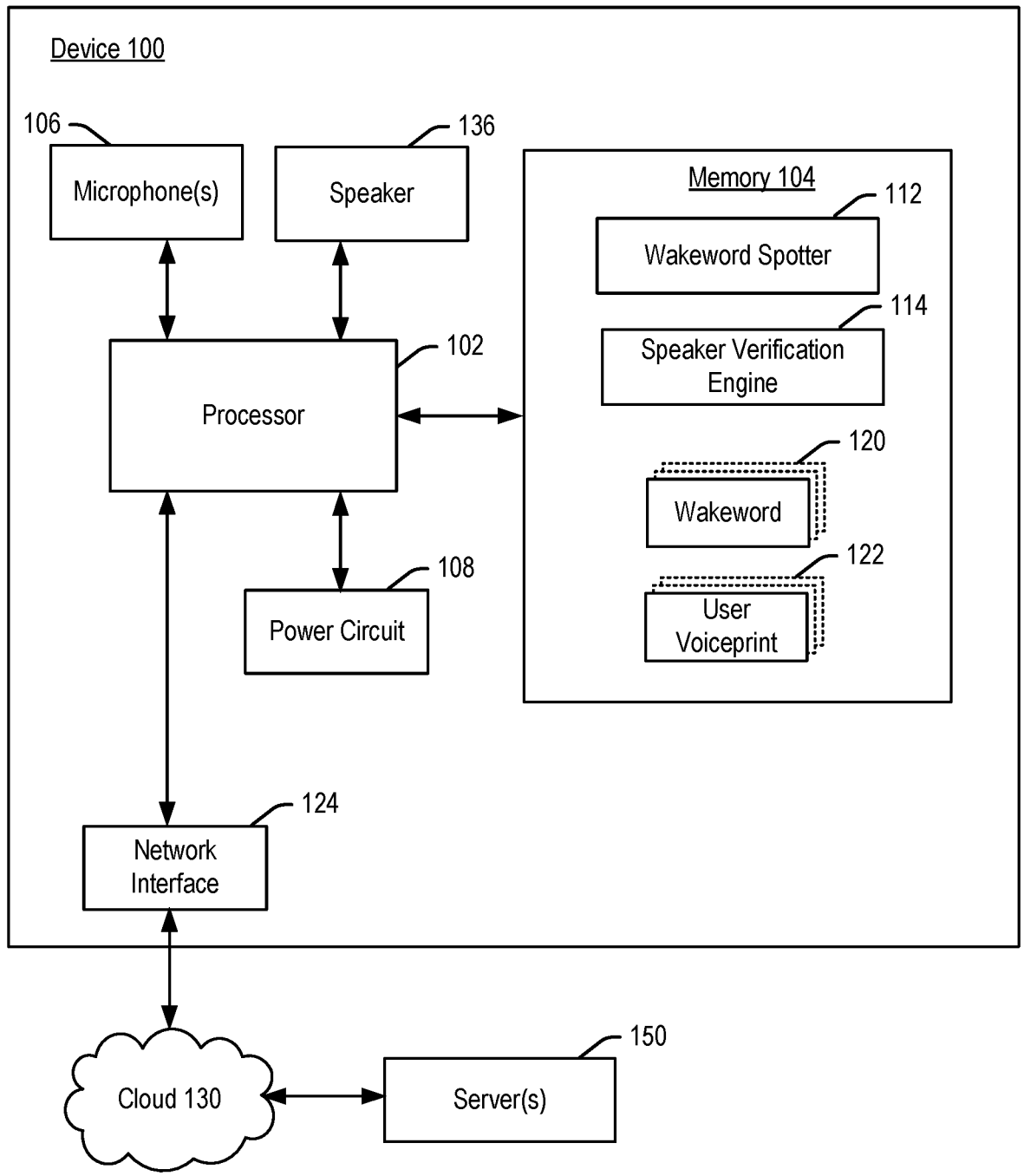
FIG. 1 is a schematic representation of a speech-enabled device according to embodiments of the present technology.

Automatic speech recognition (ASR) systems that recognize human speech, together with natural language understanding (NLU) capabilities that extract its meaning, offer tremendous potential as an easy and natural way to interface with speech-enabled devices. Such systems are enabled in part by the vast computational and communication resources available in modern devices. Advanced speech understanding systems have been developed which are able to process complex utterances to recognize a wide range of speech in different languages and dialects.

The present technology will now be described with reference to the figures, which in embodiments, relate to a system capable of parsing a received utterance into a natural language request and a speech audio segment, where the request instructs the system to use the speech audio segment as a new wakeword. This type of request will be called a wakeword assignment directive (WAD). In response to such a request, the system is further capable of building a new wakeword spotter to recognize the new wakeword, and the building of the spotter is fast enough that the new wakeword can be used immediately after the system's response to the WAD.

In the context of speech-enabled systems, the terms utterance, query, and request are closely related and can sometimes be used interchangeably. A spoken natural language request from a user is simultaneously conveyed as speech audio (the utterance) and (if correctly transcribed) as words (the query). A device may perform a variety of actions in response to a general query.

A wakeword assignment directive, or simply directive or WAD, is a request to the device to changes its wakeword set by addition or replacement.

One such action may be a natural language request in the form of a wakeword assignment directive to assign a new wakeword. Upon recognizing such a wakeword assignment directive, the present technology may immediately build a new wakeword spotter for the dynamic wakeword. As used in this context, the term 'immediately' means that the new wakeword spotter may be built within a few seconds of receiving a new wakeword, as described in greater detail below. Without the benefit of a large dataset of audio instances of the new wakeword, the use of dynamic wakewords calls for other approaches to building a new wakeword spotter quickly. These approaches include at least the following three, and their variations:
1. a wakeword segmentation approach;
2. a wakeword sampling approach; and
3. a continuous transcription approach.

Each of these is described in detail below. Immediately (e.g., within a few seconds) after completing the building of a new wakeword spotter, the dynamic wakeword and its spotter may be stored and ready to activate the device.

A parser may further identify, as part of the predefined wakeword assignment directive template, optional parameters that define variants of the directive; these can be properties of the dynamic wakeword (i.e., how it is recognized) or properties of the directive (i.e., how the WAD is fulfilled). For example, a user may specify that a new wakeword is public, meaning that other users may use the same dynamic wakeword to wake the device, or private, meaning that the new wakeword will work only for that user, to the exclusion of others. As a further example, a user may specify whether a new wakeword will replace earlier wakewords or will be used in addition to earlier wakewords.

Directive parameters have natural language phrasings that convey specific parameter values when found in a directive. When an optional parameter is absent, it may have an implicit default value, which is implementation dependent, or the system may prompt the user for a value. In this disclosure, optional directive parameters will simply be called parameters.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

FIG. 1 is a schematic block diagram of a sample speech-enabled device 100 within which the present technology may be implemented. Device 100 may be or include an agent having any of various electronic or electromechanical components configured to accept voice requests, including for example cellular telephones, digital assistants, tablets and other computing devices, automobile control systems and others.

A more detailed explanation of a sample speech-enabled device 100 is described below with reference to FIG. 9, but in general, device 100 may include a processor 102 configured to control the operations within device 100, as well as facilitate communications between various components within device 100. The processor 102 may include a standardized processor, a specialized processor, a microprocessor, or the like that may execute instructions for controlling device 100.

The processor 102 may receive and process input from various input devices, including one or more microphones 106. The microphone(s) 106 may include a transducer or sensor that may receive and convert sound into an electrical signal. According to one embodiment, the microphone(s) 106 may be used to receive audio signals which are processed as requests, requests and input to the device 100 as explained below.

As noted, device 100 may run in a low power mode when not in use to conserve energy. A power circuit 108 may be provided for controlling the power level within device 100, under the direction of processor 102. In low power mode, most device 100 systems are shut down and only a few components are run by processor 102. One such component is the wakeword spotter 112 explained below. The microphone(s) 106 also operate in low power mode to continuously monitor the environment surrounding the device 100 for audio input.

In embodiments, the device 100 may run at 0.3 to 0.5 Watts when in low power mode, and between 5 and 10 Watts when in its fully powered mode, but it is understood that the device 100 may run at different power levels in the idle or active state in further embodiments. In an example, when the wakeword spotter detects an occurrence of any one of the one or more current wakewords 120 in the input stream, the processor 102 may exit low power mode and instruct the power circuit 108 to power up the device. Upon completion of a user request, perhaps followed by the passage of a predefined period of time (e.g., 2-10 seconds), the device may return to idle, and processor 102 may instruct the power circuit 108 to switch back to low power mode. In some embodiments, such as those where the device 100 is plugged into a power outlet or has a large battery, the power circuit 108 may be omitted, and there is no low power mode. However, spotting a wakeword is still needed to activate the device, so it becomes ready to listen to a query.

In the embodiment shown, the wakeword spotter 112 is resident on the device 100. Running wakeword spotters locally may be the preferred embodiment. The operation of the word spotter is driven by a data structure 120 that contains the current wakeword(s), wakeword spotter(s) and their associated parameters. The detection of any wakeword triggers a transition to the active state.

A wakeword spotter for a wakeword may be implemented by a classifier with 2 outcomes (wakeword is matched, or not matched). In some embodiments, multiple wakewords are used simultaneously. The detection of any one of N wakewords in parallel may be achieved by a monolithic classifier with N+1 outcomes, one outcome for each of the wakewords, and one outcome for the failure to match any wakeword. In such embodiments, the highest scoring wakeword may be the one that activates the device. In other embodiments, parallel detection of multiple wakewords may be achieved by running multiple wakeword spotters in parallel fashion from the same incoming audio stream. In such embodiments, the earliest match wakeword will be the wakeword that activates the device. The possibility of using parallel spotters in this manner is a great advantage for the use of dynamic wakewords, since the addition of a new wakeword spotter can be done without consideration of pre-existing spotters.

In any of the spotter embodiments mentioned, it should be remembered that a private wakeword requires positive speaker verification before a device can be activated. The speaker verification engine 114 may run continuously, achieving low latency at the expense of power. Power consumption can be lower if speaker verification engine 114 is triggered only when a private wakeword is matched.

The speech-enabled device 100 may further include a memory 104 that may store algorithms that may be executed by the processor 102. According to an example embodiment, the memory 104 may include random access memory (RAM), read only memory (ROM), cache, Flash memory, a hard disk, and/or any other suitable storage component. As shown in FIG. 1, in one embodiment, the memory 104 may be a separate component in communication with the processor 102, but the memory 104 may be integrated into the processor 102 in further embodiments.

Memory 104 may store various software application programs executed by the processor 102 for controlling the operation of the device 100. Such application programs may for example include a wakeword spotter 112 for detecting a wakeword in a received utterance, and a speaker verification engine 114 for verifying a speaker. Speaker verification engine 114 is needed to verify the speaker's ID when a matched wakeword is a private. This is explained in greater detail later.

Memory 104 may also store various data records, including for example one or more wakewords 120 and one or more user voiceprints 122. Each of these is explained in greater detail as well.

The device 100 may further include communications circuitry such as a network interface 124 for connecting to various cloud resources 130 via the Internet. One such resource may be one or more speech recognition and spotter building servers 150, also referred to herein simply as server 150. An example of server 150 will now be explained with reference to FIG. 2.

Figure 2:
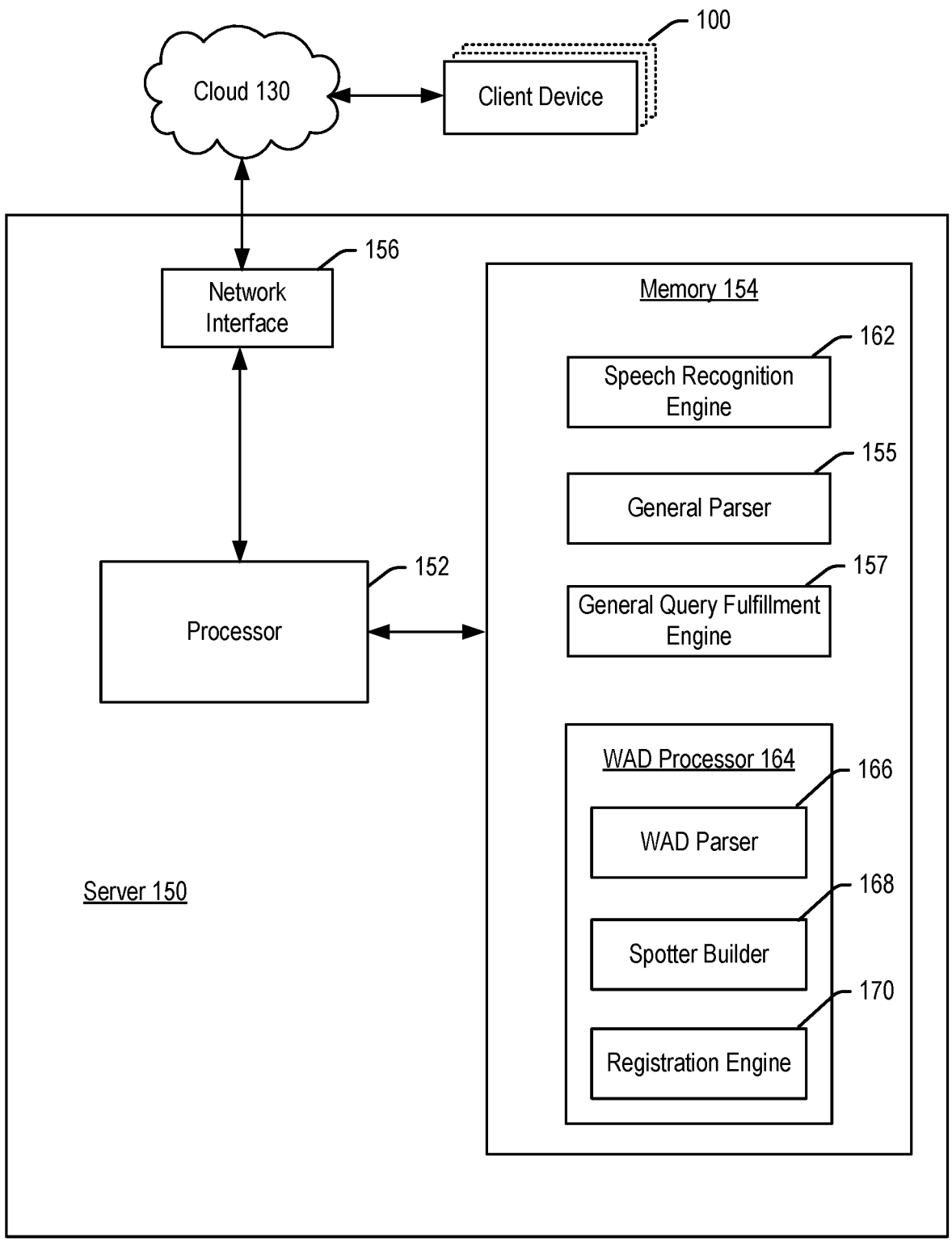
FIG. 2 is a schematic representation of a server according to embodiments of the present technology.

FIG. 2 is a schematic block diagram of an embodiment of the server 150. As noted, in further embodiments, server 150 may be comprised of multiple servers, collocated or otherwise. A more detailed explanation of a sample server 150 is described below with reference to FIG. 9, but in general, server 150 may include a processor 152 configured to control the operations of server 150, as well as facilitate communications between various components within server 150. The processor 152 may include a standardized processor, a specialized processor, a microprocessor, or the like that may execute instructions for controlling server 150.

The server 150 may further include a memory 154 that may store algorithms that may be executed by the processor 152. According to an example embodiment, the memory 154 may include RAM, ROM, cache, Flash memory, a hard disk, and/or any other suitable storage component. As shown in FIG. 2, in one embodiment, the memory 154 may be a separate component in communication with the processor 152, but the memory 154 may be integrated into the processor 152 in further embodiments.

Memory 154 may store various software application programs executed by the processor 152 for controlling the operation of the server 150. Such application programs may for example include a speech recognition engine 162 for transcribing speech. The application programs may further include a general parser 155 and general query fulfillment engine 157 for handling general (non-WAD) queries. The application programs may further include a wakeword assignment directive processor (WAD processor 164) for processing dynamic wakeword assignment requests. Speech recognition is complex, but many techniques are well established, and do not need to be described here in any detail. Suffice it to know that in most embodiments, the speech recognition engine 162 has a front-end capable of producing phonetic transcriptions of its input, while the full ASR engine 162 produces text transcriptions of the input. When the present disclosure refers to ASR engine 162, this may refer either to the ASR front-end or the entire ASR engine, depending on whether a phonetic output or a text output is needed.

The WAD processor 164 may have software components including a WAD parser 166, a spotter builder 168 and a registration engine 170. The components of the WAD processor 164 are explained in greater detail below. In particular, spotter builder 168 may build a wakeword spotter according to one of the methods explained below. The registration engine 170 reads and writes wakeword data records 120 representing the wakeword(s) used by device 100, together with their associated spotters and parameters.

The server 150 may further include communications circuitry such as a network interface 156 for connecting to cloud resources 130 via the Internet, including to client device 100. As indicted, the server 150 may communicate with multiple client devices 100, each configured as shown in FIG. 1 and as described hereinafter.

The operation and interaction of the client device 100 and server 150 to recognize a wakeword and the fulfillment of a specialized query to set new wakewords will now be described with reference to the flowchart of FIG. 3. The figure is divided between a left column, showing modules that run locally on device 100, and a right column, showing modules that, in the illustrated embodiment, run on a remote server 150. In other embodiments, some or all of the components shown in the right column may in fact run locally on device 100.

At step 200, device 100 is in the idle state, and cannot process speech requests. In this state, it continually tries to recognize a wakeword, using a wakeword spotter 112. The device may be in a low power mode to conserve energy while in the idle state. The device 100 remains idle until wakeword spotter 112 recognizes a wakeword in the incoming audio stream. One or more wakewords may be continually tested against the audio input, using one or more spotters. The current wakewords (and the corresponding spotters) are found in a wakeword data structure 120, which is local to the device.

Recall that a private wakeword is not considered as a match in the audio input if the speaker verification test fails. When a wakeword is matched, the device exits the idle state and enters the active state. Audio input starting at the end of the matched wakeword and ending at an end-of-utterance (EOU) is a spoken query. An EOU can be a pause in the speech, or a tap, button press or release. The spoken query is given as input to speech recognition engine 162, which creates a transcription of the spoken query in step 216. In embodiments, ASR engine 162 may run locally on device 100, or remotely on server 150. In some instances, the speech recognition engine 162 may generate one or more phonetic and/or textual transcriptions of the wakeword or query, and a score for each one, indicative of the confidence level of each transcription. The ASR algorithm may employ any combination of signal processing, Hidden Markov Models, Viterbi search, phonetic dictionaries, and (possibly recurrent) neural networks to generate transcriptions and their confidence scores.

In general, a virtual assistant may handle a wide variety of queries, including requests for information and commands that instruct a client device 100 to perform some action. The way queries are understood by virtual assistants varies substantially among known embodiments. In the illustrated embodiment, non-WAD queries are recognized in step 218 when they are parsed and interpreted by the general query parser 155. Specifically, after a speech recognition engine 162 generates a transcription of the query, the general query parser 155 determines the structure (syntax) and the meaning (semantics) of the query. In embodiments, this task may be done remotely on server 150 or locally on device 100. Parsing and processing of spoken queries may employ known algorithms for processing the query. Such systems are disclosed, for example, in U.S. Pat. No. 10,217,453, entitled "Virtual Assistant Configured by Selection of Wake-Up Phrase," and in U.S. Pat. No. 10,347,245 entitled "Natural Language Grammar Enablement by Speech Characterization," both assigned to SoundHound Inc., headquartered in Santa Clara, Calif., which patents are incorporated herein by reference in their entireties.

One particular type of query of relevance to the present technology is a query that requests the assignment of a new wakeword to device 100. For the purposes of FIG. 3, these specific queries, referred to herein as wakeword assignment directives or WADs, are handled (parsed) in step 218 by a special-purpose parser, the WAD Parser 166. As noted, the speech recognition engine 162 delivers both phonetic and text transcriptions. The text transcription may be used by WAD parser 166, according to known NLU algorithms, to identify the syntax of the directive. The NLU algorithm may employ one or more grammar patterns to identify the meaning of the directive portion of the query, and in some cases, of the wakeword portion as well. In general, however, a wakeword may be an arbitrary word or phrase. In special cases, it is also possible for a wakeword to be a common word or phrase, or a known name. In some embodiments, the speech recognition engine 162 may use a language model to increase the transcription score of a wakeword that is likely to be used. The NLU algorithm may also play a role in parsing wakewords. However, wakewords can be arbitrary speech segments, that is, phonetic wildcards, and they are ultimately delimited (segmented) by the directive syntax of the words around the wakeword. It is understood that a variety of schemes may be used to determine the presence of a wakeword and the presence and meaning of the directive words (phrasings) preceding or following the wakeword. It is worth noting that in all such schemes, as a wakeword segment is determined, its phonetic transcription becomes available for further processing by spotter builder 168.

Figure 3:
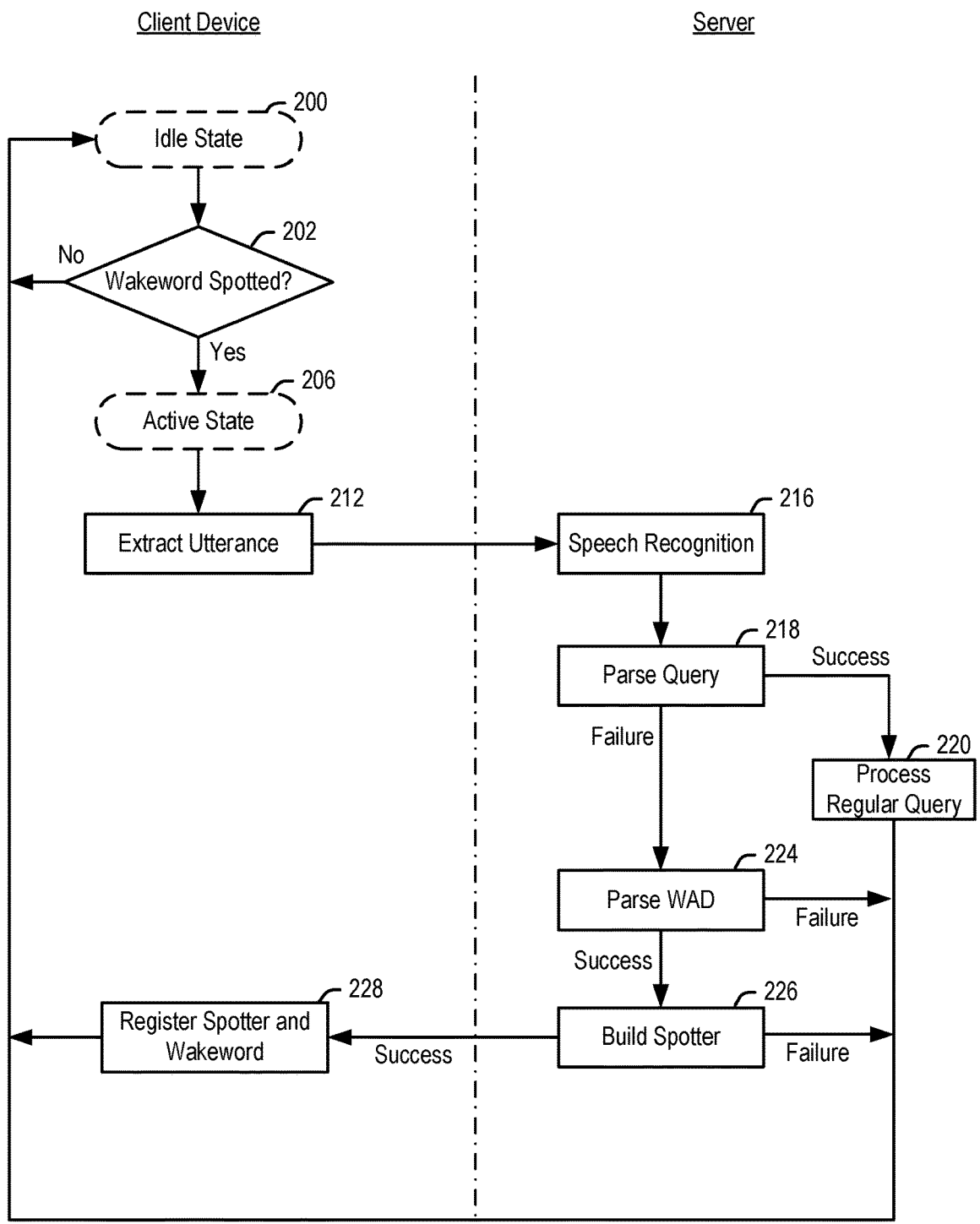
FIG. 3 is a flowchart of the operation of a speech-enabled device and server in processing user queries according to embodiments of the present technology.

In FIG. 3, the queries recognized by the general query parser 155 are handed for further processing (i.e., fulfilment) in step 220 by the general query fulfillment engine 157, which acts in the manner expected of a specific virtual assistant. No change is required to the "host" virtual assistant to implement dynamic wakewords. In a typical embodiment, shown in FIG. 3, the device returns to the idle state after the regular query is processed in step 220 by the general query fulfillment engine 157. In a variant embodiment, not shown, the device remains active (i.e., it does not require a wakeword to accept a query) for some time (i.e., a few seconds) before returning to the idle state. One way to achieve this variant is to return to the active state, but ensure that when the active state is entered, a timeout is set, at the end of which the device returns to the idle state.

When the query is a WAD, the general query parser 155 fails to recognize it in step 218. Instead, the WAD parser 166 is able to parse it in step 224 to determine the new wakeword and any optional parameters associated with the directive. In variant embodiments, the WAD parser 166 may be executed before general query parser 155, or instead both parsers 155 and 166 may be part of a single unified parser. These are small variations of the control flow shown in FIG. 3.

A parenthesis on failures: if both parsers 155 and 166 fail to recognize a query, the device will return to the idle state—most likely after issuing an appropriate error message. A failure may occur, for example, if speech recognizer 162 cannot reliably determine a transcription of the query. This is unlikely when a system allows multiple transcription hypotheses with different scores. A failure may also occur after a good transcription of the query is obtained, if the query is not grammatical: it may fail on syntactic grounds when neither parser 155 nor 166 can recognize it. Other failures may occur if a query is grammatically correct, but its interpretation (meaning) cannot be reliably determined: it is failing on semantic grounds. Moreover, a correctly interpreted query may fail during its execution, called the fulfillment of the query. The fulfilment of a regular query is performed by regular query fulfillment engine 157. The fulfilment of a WAD consists of spotter builder and registration engine 170, both of which can exhibit their own failures.

WAD parser 166 collects information from the query the directive and its parameters. Besides adding wakewords, other wakeword related actions exist, like deleting wakewords, listing wakewords, restoring wakewords to a prior state that is remembered in wakeword records 120, and so on. The disclosure focus on wakeword addition because it is technically the hardest part; other relevant actions are easy to describe. Parameters (e.g., public/private, and exclusive/inclusive) and a wakeword are also determined by the WAD parser 166. The spotter builder 168 checks whether the wakeword is acceptable for use. A new wakeword spotter may not be built, for example, if the requested wakeword is too short, or too ambiguous, or too close to a member of a list of unwanted wakewords, such as offensive words, or pre-existing wakewords for device 100. In such cases, the spotter builder 168 exits with a failure, and a message may be output to the user via device 100 to convey the fact that the request cannot be fulfilled.

If the new wakeword is accepted, the spotter builder 168 proceeds to build a spotter for the wakeword in step 226. Further details of different embodiments for building a new wakeword spotter by the spotter builder 168 are explained below with reference to FIGS. 5-8. Upon success of the spotter builder, the wakeword, its wakeword spotter and the associated parameters are handed over to the registration engine 170. When the spotter builder runs on the server 150, this data (including the new spotter) are downloaded to the device 100. The registered spotter, wakeword and parameters are stored on the device 100 in the data structure 120 containing one or more wakewords and associated data.

As an example of the operation of the flowchart of FIG. 3, the client device 100 may receive the utterance:

"OK AGENT, RESPOND TO OK JARVIS"

where "OK AGENT" is the current wakeword. The rest of the utterance, following the wakeword "OK AGENT," is the query "RESPOND TO OK JARVIS." The query may be uploaded to the server 150, and it is transcribed using speech recognition engine 162 in step 216. The WAD parser 166 recognizes the query as a directive and extracts the wakeword in step 224. In this example, the query "Respond to OK Jarvis" is a wakeword assignment directive that requests the wakeword speech audio segment "OK Jarvis" to be assigned as a new wakeword. After a successful parse of this wakeword assignment directive into its wakeword and parameters in step 224, the wakeword spotter builder 168 has to procure a spotter for the new wakeword in step 226, either by building a brand-new wakeword spotter, or by locating a pre-existing spotter for the wakeword. This can be done in a number of ways, as will be described later. The new wakeword spotter, new wakeword and associated parameters are then registered in step 228 by registration engine 170, which modifies the wakewords 120 data structure that holds the current wakeword(s), spotter(s), and associated parameters.

FIG. 3 shows one embodiment of processes performed on client device 100 or on server 150. In the embodiment shown, all processes in the left column (labeled "client device") are performed on a device 100, and all processes in the right column (labeled "server") are performed on a server 150. In alternative embodiments, some or all of the processes shown in the right column may actually be performed on the client side instead. For example, steps 216 and 224 may be performed locally on the device 100 (a WAD is recognized locally), whereas general query parsing in step 218 and general query processing in step 220 may be performed on the server 150. In such cases, WAD parser 166 runs before general query parser 155. Under these conditions, the spotter builder is provided to run in part or whole on the device 100. In a first embodiment, the spotter builder has access to the computational power and labeled audio databases of the server 100 when building a spotter. This is exemplified by a segmentation approach to spotter building, described later. In a second embodiment, the spotter builder is entirely local; this will be exemplified by a transcription approach to spotter building, described later.

As noted, wakeword assignment involves a directive, a new wakeword speech audio segment, and optional parameters that control the handling of the new wakeword. In an example, the parameters may relate to whether the newly assigned wakeword is to be public or private. Public wakewords may be used by anyone to wake the device 100 and gain access to device 100's resources. A private wakeword, on the other hand, is personal to the user that created it, so that the device 100 will only activate when the wakeword is spoken by the wakeword creator, and remain in the idle state when spoken by others. In another example, the parameters may relate to whether a new wakeword is to be added to the wakeword set of existing wakeword(s) or is to replace some or all of the existing wakewords.

Figure 4:
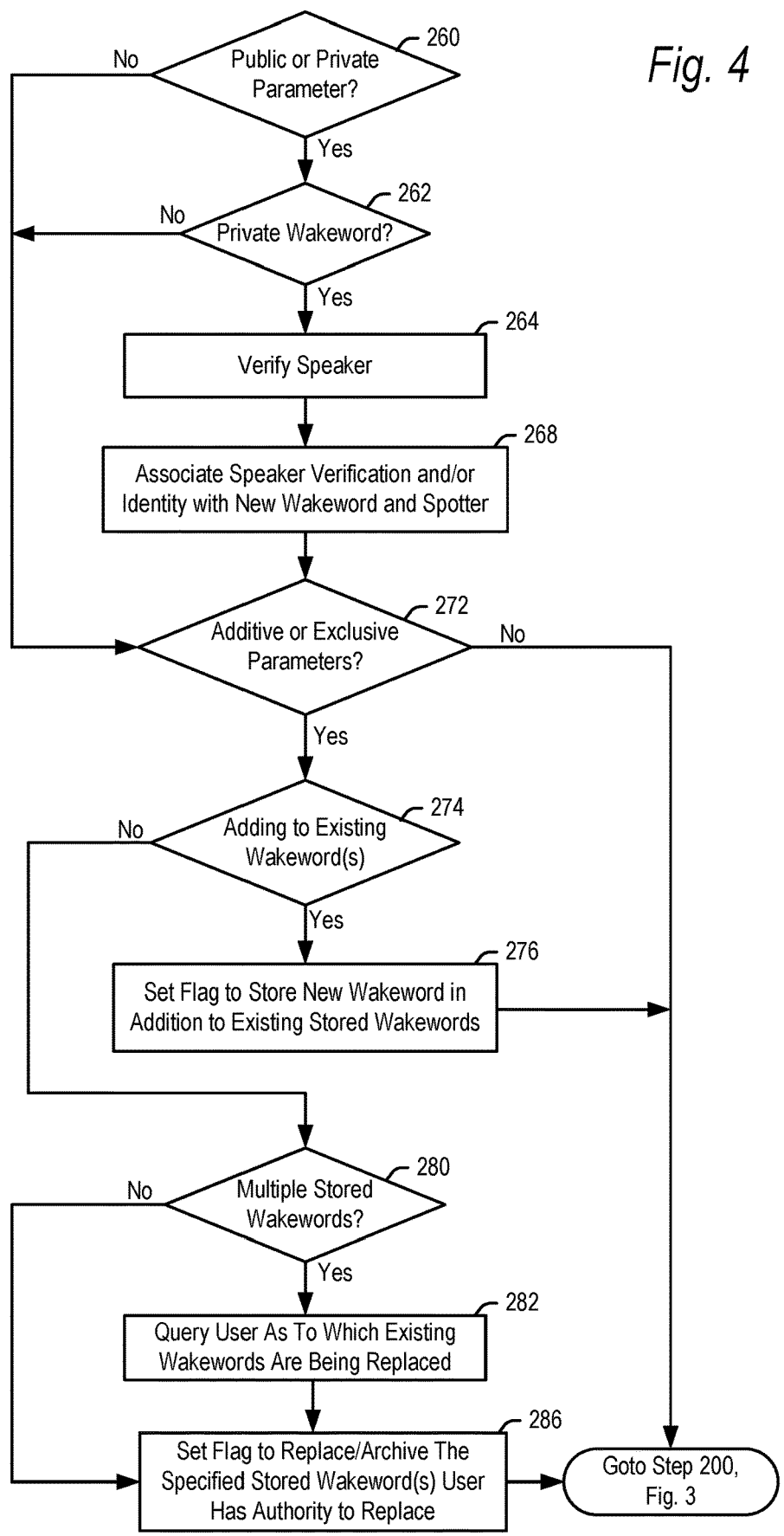
FIG. 4 is a flowchart of the operation of a system for making a wakeword public, private, additive or exclusive.
Figure 5:
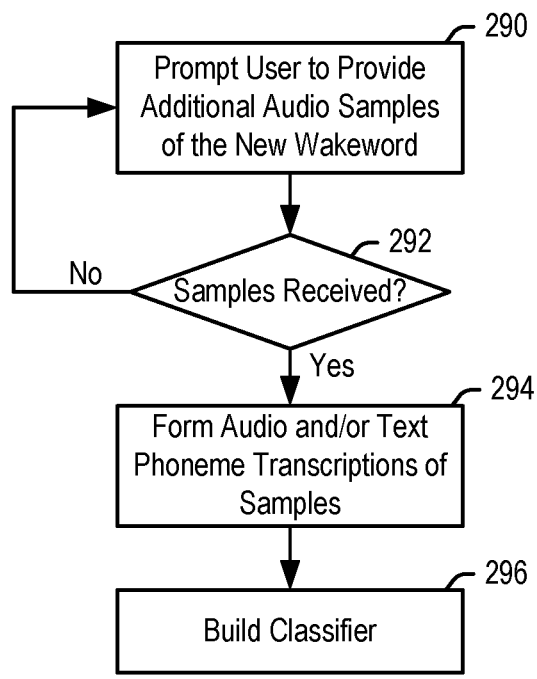
FIG. 5 is a flowchart providing further detail of an embodiment of a spotter builder based on a wakeword sampling approach.
Figure 6:
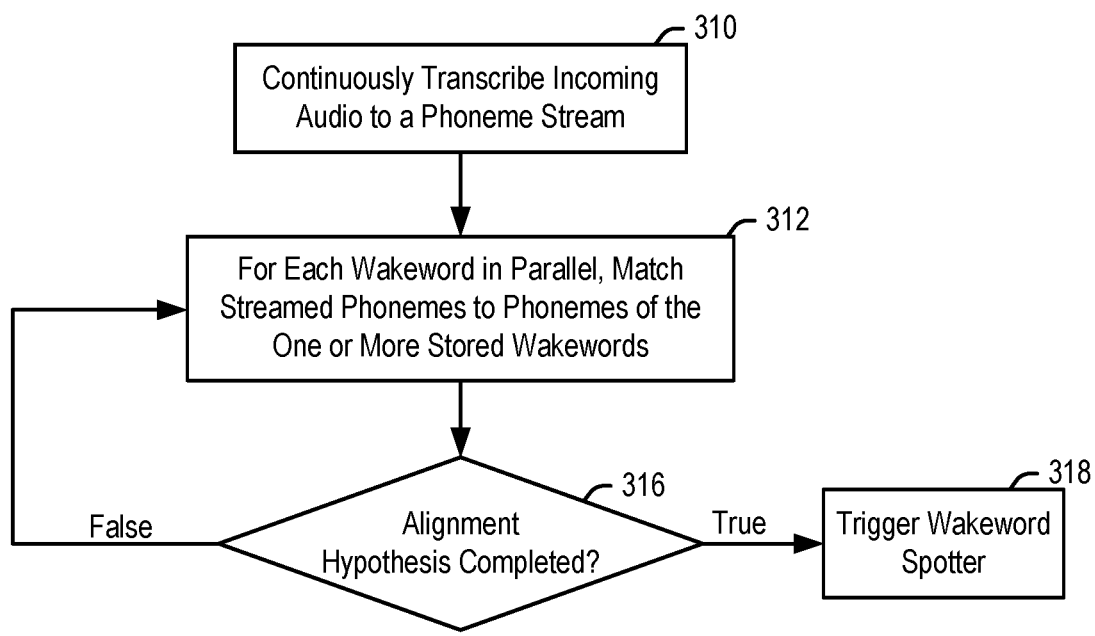
FIG. 6 is a flowchart providing further detail of an embodiment of a spotter builder based on a continuous transcription approach.
Figure 7:
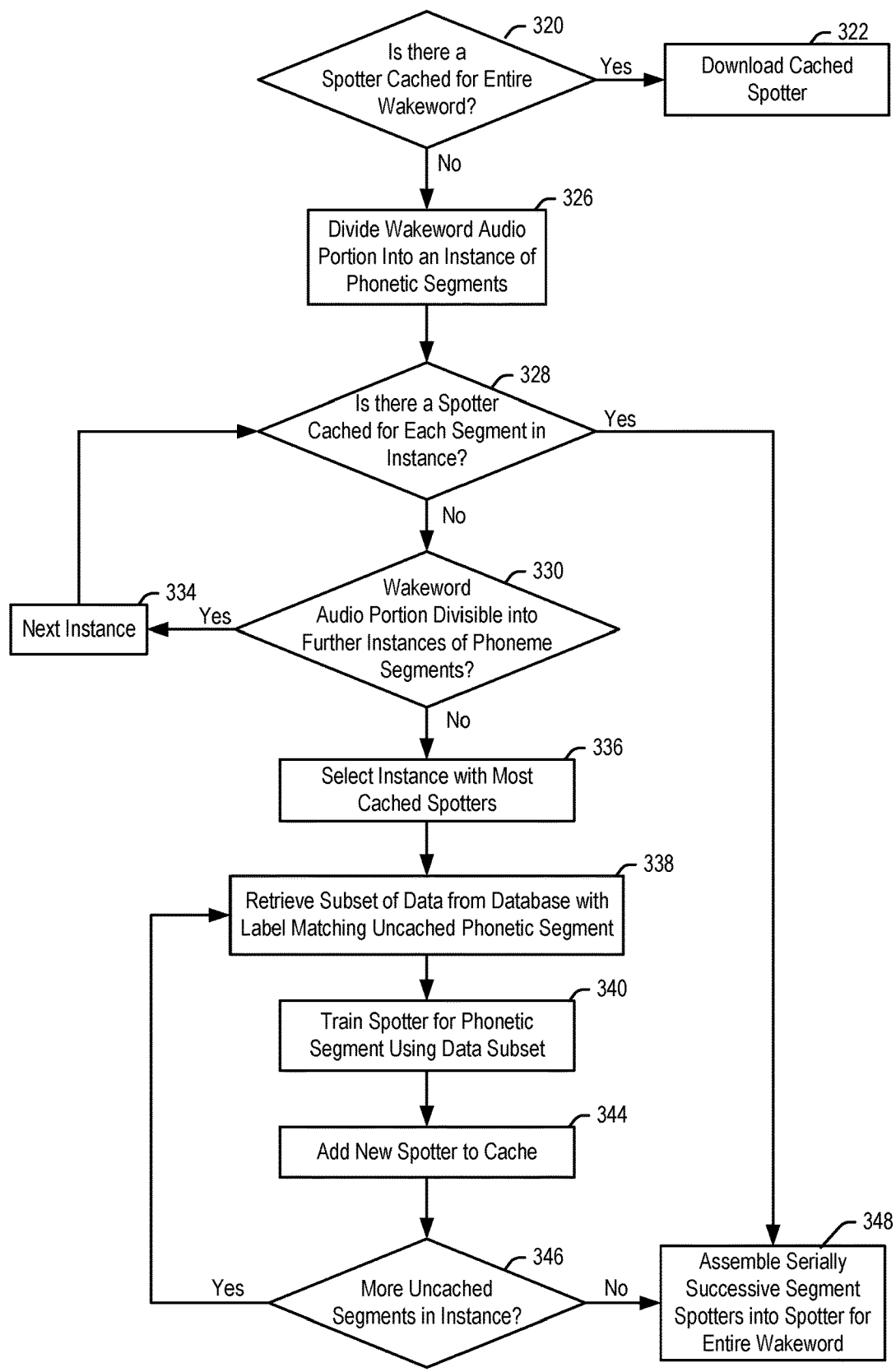
FIG. 7 is a flowchart providing further detail of an embodiment of a spotter builder based on a wakeword segmentation approach.

Referring now to the flowchart of FIG. 4, in step 260, the WAD processor 164 may check whether a wakeword assignment directive includes parameters stating whether a new wakeword was public or private. The following are a few examples of parameters which may indicate to the WAD processor 164 that a wakeword is to be public. In the following examples of wakeword assignment directives, the wakeword itself has been omitted, leaving only the query portion of the utterance.

"RESPOND TO OK VICTORIA" (assuming the default is "public")
"RESPOND TO PUBLIC WAKEWORD OK MADELINE"
"RESPOND TO OK MADELINE PUBLIC WAKEWORD"
"WE WILL CALL YOU HEY JACKSON"

In the first example, no parameter is provided, so that the WAD processor 164 defaults to assigning the new wakeword "OK Victoria" as a public wakeword. In the second example, the parameter phrasing "public wakeword" is expressly stated before or after a speech audio segment and sets the corresponding property. WAD parser 166 may look for such predefined parameter phrasings so as not to treat them as part of the speech audio segment. In the fourth example, the "public" parameter setting is not explicit, but it may be inferred from the use of the plural subject "we" (as opposed to a singular "I") in the wakeword assignment directive, which subtly designates the new wakeword "Hey Jackson" as a public wakeword. A wide variety of other examples of wakeword assignment syntax may be imagined, where an explicit or implicit phrasing of the parameter in the spoken wakeword assignment directive indicates that the new wakeword is to be public.

Alternatively, the wakeword assignment directive may include parameters indicating that a wakeword is to be private. The following are a few examples.

"RESPOND TO OK VICTORIA" (assuming the default is "private")
"PRIVATELY RESPOND TO OK JOSEPHINE"
"RESPOND TO OK JOSEPHINE PRIVATELY"
"RESPOND TO PRIVATE WAKEWORD HEY CHRISTOPHER"
"I WILL CALL YOU TABATHA"
"YOUR NICKNAME IS PENELOPE"

The first example shows that that default may instead be to make a wakeword private when no parameter is provided. In the next four examples, parameter phrasings "privately" or "private wakeword" or "nickname" are used as part of the query, before or after a speech audio segment, to convey the private parameter setting. In the last examples, the private setting may be inferred from the use of the first person singular subject pronoun "I" at the start of the query. A wide variety of other examples can be created where explicit phrasings within the spoken wakeword assignment directive, or contextual parameters, indicate that the new wakeword is intended to be private.

If public/private parameter is detected in step 260, the WAD processor 164 may check in step 262 whether private parameter is present. If not, the WAD processor 164 may treat the new wakeword as public when stored. If, on the other hand, the parameter indicates that the wakeword is private in step 262, the WAD processor 164 may perform a step 264 of creating a voiceprint for the speaker's voice, and perhaps additional speaker verification data. User voiceprint information may be stored on device 100 in voiceprints data structure 122, or available to device 100 from cloud user records, for later speaker verification.

In step 268, the WAD processor 164 may associate speaker verification data with the new wakeword and spotter, by computing a voiceprint. The WAD processor 164 may treat the new wakeword as private, and store speaker verification data. Such verification data, such as voiceprints, may be stored in memory 104 for individual users in user voiceprints 122.

In operation, upon receiving an utterance and confirming the presence of a private wakeword, the processor 102 may further check whether the speaker is the same speaker that created the private wakeword using data from a user voiceprint 122 associated with the private wakeword. If there is a match, the processor 102 may signal the power circuit 108 to power up the device 100. If there is no match, the processor may ignore the wakeword and remain in the idle state.

Instead of, or in addition to, public/private parameters, a wakeword assignment directive may include parameters as to whether the new wakeword is to be added to the wakeword set of the one or more existing wakewords or replace the one or more existing wakewords in the wakeword set. In step 272, the WAD processor 164 checks whether the wakeword assignment directive includes a parameter as to whether the new wakeword is to be added to the existing wakewords or replace existing wakewords. The following are a few examples of parameters which may indicate to the WAD processor 164 that a wakeword is to be added to existing wakewords.

"RESPOND TO OK FREDERICK"
"RESPOND TO ADDED WAKEWORD ESTEBAN"
"ALSO RESPOND TO OK SAMUEL"

In the first example, no parameter is provided so that the WAD processor 164 defaults to adding the new wakeword "Frederick" to other existing wakeword(s) 120. Thus, a user can wake the device 100 with the wakeword "OK Frederick" in addition to the one or more previously existing wakewords 120 in memory 104. Here, the new wakeword is said to be additive to the existing wakewords. In the second example, the parameter "added wakeword" may be a predefined phrase which is expressly stated before or after a speech audio segment to make the new wakeword additive to the existing wakewords. When parsing the received wakeword assignment directive, the WAD processor 164 may look for such predefined parameters so as not to treat them as part of the speech audio segment. In the third example, the parameter "also" (part of "also respond to" or "respond also to") explicitly requests adding the new wakeword to existing wakewords. A wide variety of other examples are contemplated where express and/or contextual parameters within the spoken wakeword assignment directive indicates that the new wakeword is additive to the wakeword set of one or more existing wakewords.

Alternatively, the wakeword assignment directive may include parameters indicating that a wakeword is to replace one or more of the current wakewords. The following are a few examples (underlining for parameter emphasis):

"RESPOND TO OK BRITTANY EXCLUSIVELY"
"RESPOND ONLY TO MARLENA"

The first example shows that that default may instead be to make a wakeword exclusive and remove previous wakewords when no parameter is provided. In the second example, the parameter "exclusively" may be a predefined phrase which is expressly stated following a speech audio segment. In the third example, the parameter "only to" may be a predefined phrase which is expressly stated before a speech audio segment. Instead of being predefined phrases indicating exclusivity of the new wakewords in the second and third examples, the exclusivity of the new wakeword may be inferred from the context of the parameters in the wakeword assignment directive. A wide variety of other examples are contemplated where express and/or contextual parameters within the spoken wakeword assignment directive indicates that the new wakeword is to be private.

If an exclusive or additive parameter is detected in step 272, the WAD processor 164 may check in step 274 if the parameter indicates the new wakeword is additive. If so, a flag may be set to store the new wakeword in addition to the existing wakewords when the new wakeword is stored. If, on the other hand, the parameter indicates that the wakeword is replacing one or more existing wakewords in step 274, the WAD processor 164 may check in step 280 whether there are multiple wakewords stored. If so, the processor 102 may generate a query as to which of the multiple wakewords are to be replaced. Alternatively, steps 280 and 282 may be skipped, and all existing wakewords may be replaced by default.

Where one or more wakewords are being replaced, a flag may be set in step 286 indicating which of the stored wakewords is/are being replaced when the new wakeword is stored. It may happen that a user does not have authority to replace one or more of the wakewords, which may be determined for example from data stored in the user voiceprints 122 in memory 104. In this instance, the processor may replace only those wakewords which the user has authority to replace.

It is further understood that parameters relating to both private/personal and additive/exclusive may be provided in a single wakeword assignment directive. The following are a few examples.

"I WILL ONLY CALL YOU OK ROBERT"
"WE WILL ALSO CALL YOU OK NATALIA"

In the first example, the use of the first person singular subject pronoun "I" at the start of the wakeword assignment directive designates the new wakeword "OK Robert" as a private wakeword, and the use of the word "only" makes it an exclusive wakeword. In the second example, user of the first person plural subject pronoun "we" at the start of the wakeword assignment directive designates the new wakeword "OK Natalia" as a public wakeword, and the use of the phrase "also" makes it an additive wakeword. While the wakewords in the above examples are common names for people, it is understood that a wakeword 120 may include any word or phrase, nonsensical or otherwise. In further embodiments, it is conceivable that a new wakeword be formed from sounds other than voice, such as for example a doorbell, alarm or drum beat to name a few possibilities.

While the above discussion of parameters relates to two particular aspects (private/personal and additive/exclusive), it is understood that parameters relating to other aspects of generating new wakewords and spotters therefore may be also be provided in addition to, or instead of, the above examples.

Moreover, in the above examples, the parameter was provided in the single utterance comprising the wakeword assignment directive. In further embodiments, parameters may be established in a modal discourse between a user and the device 100. In particular, the user may initially utter a wakeword assignment directive without parameters. Thereafter, the WAD processor 164 may prompt the user to provide additional parameters and information by the processor 102 generating text which is converted to speech by a TTS algorithm and played over the speaker 136. The following provides examples of how parameters may be prompted for and provided in such a modal discourse.

(U) RESPOND TO JARVIS
(D) GOT IT. CAN YOU SAY THAT THREE TIMES?
(U) JARVIS . . . JARVIS . . . JARVIS
(D) OK, I NOW RESPOND TO JARVIS
(D) SHOULD JARVIS BE PRIVATE OR PUBLIC?
(U) PUBLIC
(D) SHOULD I SAVE PREVIOUS WAKEWORDS?
(U) NO
(D) ARE YOU SURE YOU WANT TO FORGET THE DEFAULT PUBLIC WAKEWORD OK AGENT?
(U) NO, TELL ME THE WAKEWORDS
(A) SURE. JARVIS IS A PUBLIC WAKEWORD AND OK AGENT ISA PUBLIC WAKEWORD.
(U) DISABLE THE PREVIOUS WAKEWORDS OR
(U) DISABLE OK AGENT
(D) OK AGENT IS NOW DISABLED

The above is a sample modal discourse between a user (U) and the device 100 (D). As seen, the device 100 may receive a wakeword assignment directive, and prompt the user to repeat the wakeword a few times. After that, the device 100 may prompt the user to specify whether the new wakeword is public or private, and additive or exclusive.

For a device 100 controlled by a single owner, the device may have its (private or public) wakewords set by the device owner, and for other users to have no control over this. However, where a device 100 is a shared device, controlled by multiple users, it may be desirable to preserve public wakewords after they are replaced. In particular, when a directive replaces all previous wakewords on a device, there is a danger that users (maybe even the user who issued the directive) will be locked out, and unable to activate or access the resources of device 100.

A recovery procedure may thus be provided to avoid bad consequences from such a lockout. In this instance, the device 100 may be restored to a previous state, in which former wakeword access is restored. This allows a minimum level of default functionality to users who did not issue the directive for the new wakeword, and may not even be aware that the wakeword they were using was replaced by a new one. In some systems, this is achieved by a hard reset— either to factory settings, or to a previously saved working configuration of the wakeword set.

In embodiments, a complex mix of wakeword replacement policy, a wakeword addition policy and/or procedure to save and restore wakeword set configurations may both supported, through the use of single directives and/or modal dialogs. For devices with GUIs in addition to audio, such as a dedicated reset button, these other interfaces may be used instead of or in addition to audio signals for wakeword recovery. For devices that do not have a GUI other than audio, a full reset of the device state can be accomplished via the audio interface (microphone and speaker) and/or by power cycling.

The following is a further example of a modal dialog for setting a dynamic wakeword, including recovering replaced wakewords.
   (U) RESPOND TO PUBLIC NAME BUTLER3
   (D) OK, BUTLER THREE, IS THAT RIGHT?
   (U) YES
   (D) SHALL I KEEP MY PRIVATE NAME, JARVIS?
   (U) NO
   (D) AND KEEP MY PUBLIC WAKEWORD OK AGENT?
   (U) PLEASE DISABLE IT
   . . . time passes . . . .
   (U) BUTLER3, WHAT ARE THE WAKEWORDS?
   (D) BUTLER THREE IS AN ACTIVE PUBLIC WAKEWORD, AND OK AGENT ISA DISABLED PUBLIC ONE.
   . . . time passes . . . .
   (U) BUTLER3, RESTORE PREVIOUS WAKEWORDS
   (D) OK AGENT IS NOW A PUBLIC WAKEWORD.
Again, other examples of modal dialog are contemplated.

The above describes a procedure for setting a new wakeword using an audio directive via the one or more microphones 106. In alternative embodiments, the device 100 may have other interfaces, such as a GUI or physical (touch) interface configured to implement a wakeword assignment directive in whole or in part. For example, a device can have a reserved button that can be held down to enter the new wakeword and released at the end of the speech audio segment. Further, a push of the button followed by an immediate release might cause the device to speak out its current wakeword(s) and corresponding status (e.g., public or private).

As set forth above, step 226 (FIG. 3) involves building the wakeword spotter for a dynamic wakeword. As noted in the Background section, effective wakeword spotters may be designed for factory-installed wakewords by gathering a large dataset related to the predefined wakeword and then training an acoustic model such as a neural network using the large dataset. This technique is not feasible for dynamic wakewords, in that such datasets generally will not exist for dynamically selected wakewords.

The present technology overcomes this problem by using one or more methods that immediately build a wakeword spotter for any valid dynamic wakeword. As noted above, the use of the term 'immediately' here means that the new wakeword spotter may be built within a few seconds (e.g., 2 to 5 seconds) after the user has completed uttering the wakeword assignment directive. In another example, the term 'immediately' applied to the time it takes to build a spotter may mean the time it takes for a confirmation response to the WAD being completed. For example, the spotter will be considered to be built 'immediately' when it is built by the time the following responses are provided: "I will now respond to Jarvis" or "Josephine is now a public wakeword," etc. . . .

In embodiments, the wakeword spotter for a new wakeword is built by the spotter builder 168 of the WAD processor 164 (FIG. 2). As noted above, while FIG. 2 shows the spotter builder 168 on server 150, components of the spotter builder 168 may reside and be implemented on the server 150, the device 100 or a combination of the server 150 and device 100.

Wakeword Sampling Approach to Spotter Building

In one embodiment, the spotter builder 168 may build a wakeword spotter using what is referred to herein as a wakeword sampling approach. In this approach, multiple sample utterances of a new wakeword are collected from the user, then used to build the new wakeword spotter by locally training a classifier. The approach will now be described with reference to the flowchart of FIG. 5.

In steps 290 and 292, the spotter builder 168 uses a modal dialog to ask the user to provide additional audio samples of the new wakeword. Some embodiments may request one wakeword at a time; others may leave it open-ended, so the user can provide multiple samples. The reception of sufficient number of samples of the new wakeword (e.g., four or more) may be confirmed in step 292. It may be less than four in further embodiments. The initial audio sample for the wakeword, together with the additional audio samples collected by steps 290 and 292, will be used in step 296 to build a classifier (such as a neural network (NN) classifier) that will serve as a wakeword spotter. The collected samples serve as positive instances of the wakeword. To avoid false positives, it can be useful to add negative instances during the training. Negative instances, when used, may be generated in a number of ways. In an embodiment, the audio samples of the wakeword may be transcribed to phoneme sequences by an ASR front-end; these sequences may then be perturbed slightly to create near misses. Negative audio samples may be obtained from the near miss phoneme sequences, using speech synthesis. In a simpler variant of the previous embodiment, a single phoneme sequence is used, the one from speech recognition step 162. In this variant, there is no need for additional transcription steps.

This is especially convenient when step 162 is performed on a server, as the device 100 is relieved from having to support the ASR function 162.

In summary, the wakeword sampling approach proceeds in three steps:
1. collect positive audio samples of the wakeword;
2. optionally generate some negative audio samples of the wakeword; and
3. train a classifier that will be the desired wakeword spotter.

These steps may be performed locally on device 100, or they may be performed on the server. A local implementation of the wakeword sampling approach on a device with limited resources is computationally feasible because the set of training samples is very small. Small training datasets provide limited reliability. Because positive samples are from a single speaker, the wakeword sampling approach may prove most reliable when used with a private wakeword, which is only used by the specific user who created it. Accordingly, device 100 may use a speaker verification engine 114 to verify that the current speaker's voice matches that of the speaker who created the private wakeword. Device 100 stores user voiceprints 122 to support this function, in conjunction with speaker verification engine 114.

Continuous Transcription Approach to Spotter Building

In another embodiment, the spotter builder 168 may implement a spotter using what is referred to herein as a continuous transcription approach. In this approach, the spotter algorithm relies on an embedded speech recognition engine 162 (or more precisely, an ASR front-end) to generate a continuous phonetic transcription of the input audio. To achieve the low latency required by a spotter, the speech recognition front-end may run locally on device 100. The flowchart of FIG. 6 describes such an embodiment. In step 310, the speech recognition front-end maps the incoming audio stream to a phoneme stream, which is a continuous phonetic transcription of the input. In step 312, the wakeword spotter attempts to match a contiguous segment of the incoming phoneme stream with the phoneme sequence of an active wakeword. This is done on a continuous, ongoing basis, for each possible alignment of the wakeword's phoneme sequence against the phoneme stream. When an alignment hypothesis is started, it remains active as long as a phonetic match is maintained. If there are several active wakewords in the wakewords 120 data structure stored in memory 104, the incoming phoneme stream will be compared in this manner with each stored wakeword in parallel. The steps above may be applied incrementally whenever a new phoneme appears in the incoming phoneme stream. The first match detected (the alignment hypothesis completed in a match) in step 316 will trigger the wakeword spotter in step 318. If at any time during the alignment hypothesis a phonetic match fails, the flow returns to step 312 to look for a new phoneme sequence.

In embodiments, multiple phonetic transcriptions of the incoming audio stream may be considered in parallel, for example using a phoneme lattice data structure. Similarly, in embodiments, multiple phonetic transcriptions of a wakeword may be considered in parallel, for example using a phoneme lattice data structure. Whenever multiple hypotheses are considered, they may have associated probabilities or scores. In embodiments, wakeword phonetic sequences are associated with a time component for each phoneme, and phonetic alignments receive a score associated with the amount of temporal stretching between the wakeword phonemes and the incoming phonemes. In embodiments, low alignment scores, or low probabilities or scores of alternative hypotheses, may result in dropping an alignment hypothesis.

This approach to providing a wakeword spotter is advantageous in that it does not require training based on a stored dataset—whether that is a large remote dataset on a server, or a small set of samples of the dynamic wakeword, collected when the need arises. The approach is well-suited for use of public wakewords by different people, and for robustness to noise, because the speech recognition engine 162, or rather, its ASR front-end, which generates a phoneme stream from the incoming audio stream, is pre-trained for a broad range of speakers and conditions. Depending on battery technology, this approach may be best suited to devices 100 that are plugged into a power outlet, or that can draw the battery power needed to perform continuous phonetic transcription, though this need not be so in further embodiments. Matching the continuous phonetic transcription input with stored wakeword phoneme sequences can be performed quite efficiently.

A major variant of the approach just described is using a continuous text transcription instead of a continuous phonetic transcription. A full speech recognition module 162 may in general involve a large phonetic dictionary and a large language model, both of which consume significant memory. In the current situation, it is possible to ignore the language model altogether (reducing space considerably) as well as use a reduced phonetic dictionary—a default phoneme-to-text transducer that does not take exceptions into account.

The transcription approach does not involve training per se, such as training a NN, but it does "build" a spotter, consisting of a phoneme sequence matching algorithm and one or more target phoneme sequences.

Wakeword Segmentation Approach to Spotter Building

In a still further embodiment, the spotter builder 168 may build the wakeword spotter using what is referred to herein as the wakeword segmentation approach. This approach starts with the phonetic transcription of the new wakeword, available from the speech recognition step 216 that precedes step 226. Such an approach will now be described with reference to the flowchart of FIG. 7 and the illustration of FIG. 8.

After parsing of a received utterance by the WAD parser 166, the phonetic wakeword transcription of the parsed utterance may be tested in step 320 to see if there is a wakeword spotter already trained and cached for the entire wakeword. Such a spotter may be cached on the server 150 but may alternatively be cached on the device 100 or a third-party server.

For example, FIG. 8 shows the phonetic transcription of a wakeword from a WAD. In this example, the wakeword "HEY CHRISTOPHER" may be phonetically written "HH EY1 K R IH1 S T AH0 F ER0" using the CMU phonetic alphabet. CMUP is a standard phonetic alphabet for English. Other phonetic alphabets (such as IPO, the International Phonetic Alphabet) may be used to define phoneme sequences for wakeword spotters for English or other languages. Step 320 tests whether there is a cached spotter already trained for that entire phoneme sequence. If so, that cached spotter is downloaded in step 322 and used as the new wakeword spotter for the new wakeword "HEY CHRISTOPHER."

When no cached spotter exists for the entire new wakeword, the wakeword may be divided into multiple phonetic segments in step 326. The division of the wakeword portion into a sequence of phonetic segments may be done in any of a variety of ways, including segmenting the wakeword portion into words or groups of syllables, individual syllables or finer divisions. As a simple example, FIG. 8 shows a root segmentation, Segmentation 1, where the entire wakeword is a single segment, a second segmentation, Segmentation 2 where the wakeword is broken into phonetic segments from the separate words "HEY" and "CHRISTOPHER."

In step 328, the spotter builder 168 checks whether a spotter already exists and is cached for each of the phonetic segments in the current segmentation. If so, these spotters for each of the phonetic segments are assembled together in order of the serially successive phonetic segments in step 348. These successive spotters are then downloaded and used as the new wakeword spotter.

If at any time the spotter builder 168 determines that a phonetic segment in a given segmentation does not have a corresponding cached spotter, the engine 168 next checks in step 330 whether there are further possible divisions of the wakeword into phonetic segments. For example, FIG. 8 shows a further segmentation, Segmentation 3, where the wakeword is further divided into syllables. Syllabification algorithms exist, that automatically segment valid phonetic sequences into syllables. Further division is possible as discussed later. If another such segmentation is possible in step 330, a new step of division is taken in step 334, resulting in a new segmentation, which is tested again in step 328 to see if there is a spotter cached for each segment in the new instance.

Whenever a division (segmentation) of the wakeword phoneme sequence has been completed, the wakeword segmentation approach builds new spotters for any phonetic segments that do not have a spotter already cached in memory. To build a new spotter for a phonetic segment, this technique depends upon access to a labeled audio database in memory 154 on the server 150. In particular, it is possible to retrieve a collection of audio samples that correspond to a specific phoneme sequence from a database of audio segments labeled by their phonetic transcriptions. In some embodiments, this search may be optimized by the use of a pre-computed index, such as a tree-like structure ("trie") whose nodes are associated with corresponding places in the audio segment corpus.

A spotter may then be trained based on using the retrieved matching segments for positive examples of the wakeword. Negative examples, useful for training a yes/no classifier, can be obtained a number of ways. "Near-matches" are useful to avoid false positives; one can perturb the segment phonetic sequence (for example by using a closely related phonetic sequence) to obtain false positives. Random audio samples may also be used, which will contribute to improving the classifier's output probabilities.

As it is most efficient to build as few spotters as possible, the spotter builder 168 may select in step 336 the instance already having the most cached spotters for its phonetic segments. Then, in step 338, the spotter builder 168 retrieves a subset of data from a database in memory 154, as described above, to be used in training a spotter for a phonetic segment not having a cached spotter. The spotter for this phonetic segment is trained in step 340 using the subset of data. Once the spotter is trained for this phonetic segment, the spotter may be added to cash in step 344.

In step 346, the spotter builder 168 may check whether there are additional phonetic segments in the selected instance which do not already have a cached spotter. If so, a new phonetic segment is selected and steps 338, 340 and 344 are repeated on the new phonetic segment. This process continues until all phonetic segments have a cached spotter in step 346. At that point, all of the cached spotters for each of the phonetic segments are assembled together in order of the serially successive phonetic segments in step 348. These successive spotters are then downloaded and used as the new wakeword spotter.

In embodiments, the training of spotters for phonetic segments in this approach (steps 338 and 340) may be performed on server 150, for computational reasons, or due to the amount of storage required for the labeled audio database and/or the segment spotter cache. The step 348 of assembling spotters for different phonetic segments in the wakeword spotter may be done on the server 150 and downloaded to the device 100, or performed on the device 100 itself In embodiments, the successive spotters assembled in step 348 for each successive phonetic segment may be viewed as a yes/no classifier which, given an input stream, determines a probability for yes (matching its phonetic segment) and for no (failure to match). The success path for the spotter is the all-yes path: the spotter succeeds if every classifier step has a probability above a threshold, and the overall probability of the path (product of probabilities over the path, or sum of log-probabilities) is above a threshold. The spotters are applied to audio in many successive alignments, such as, at every frame for a given frame rate.

In the above example, the method tests whether spotters exist in the cache for phonetic segments of a new wakeword at a variety of levels. The algorithm of FIG. 7 performs a progressive deepening in which phonetic segments from the wakeword are successively divided. This allows the method to take advantage of large pre-existing wakeword segment spotters. But there are simpler algorithms, in which a specific level of phonetic segmentation is assumed. In a variant, the wakeword may be divided into words—assuming a word segmentation of the wakeword is available besides the phonetic sequence. In another variant, the wakeword phonetic sequence may be segmented into syllables. Syllable-level spotters may thus be built and cached one a need basis. But one could imagine that spotters could be precomputed for every possible syllable. In embodiments, wakeword spotters may be predefined and stored on server 150 for a defined enumeration of all required phonetic segments (such as, for all syllables). This is in principle feasible and should perform well, allowing the task to complete without having to train in step 340 any new segment spotters. But there are very many possible syllables in English, or in other languages.

Syllables are formed of three clusters, an onset, a nucleus and a coda, where the nucleus cluster is composed of vowels, and the onset and coda clusters are composed of consonants. For example, using the CMU phonetic alphabet, the syllable "S T R EE T S" ("streets") has a 3-consonant cluster "S T R" preceding a single-vowel cluster "EE" and a 2-consonant coda, "T S."

One further variant is to perform sub-syllable segmentation as a further phonetic segment classification for which all wakeword spotters may be trained. For example, each vowel can be split into an initial part, that includes the initial consonant cluster and at least the initial vowel, and a final part, that includes the final vowel and the final consonant cluster. When the vowel cluster has length 1, the vowel is both initial and final. When it has length 2, it consists of an initial vowel and final vowel. When it has length 3, some further rules may be employed to decide how to split the consonant cluster.

In any of the above-described embodiments, once a wakeword spotter has been created, it may be registered by registration engine 170, including storing or caching the wakeword and wakeword spotter in memory, even after the wakeword for that spotter has been changed. In that way, the cached wakeword spotter may be immediately pulled up if the old wakeword is again used.

In embodiments described above, a single spotter may be used to spot a wakeword, even when the wakeword is a phrase containing multiple words. In further embodiments, a "multi-spotter" may be used to spot a wakeword which contains multiple words. When N words are involved in a wakeword, an activation module may depend on running N spotters in parallel for the multiple words in the wakeword (each of the N spotters having a binary output, MATCH or FAIL) or a joint spotter may be trained (such as a classifier with N+1 outcomes, one for each possible MATCH and one for FAIL), or a combination of the two.

Figure 9:
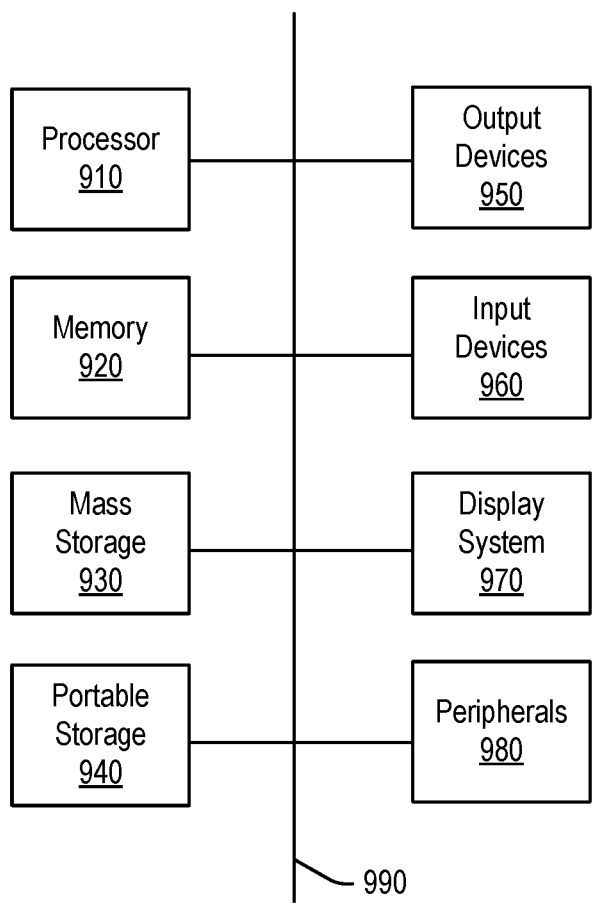
FIG. 9 is a schematic block diagram of a computing environment according to embodiments of the present technology.

FIG. 9 illustrates an exemplary computing system 900 that may be device 100 or server used to implement an embodiment of the present technology. The computing system 900 of FIG. 9 includes one or more processors 910 and main memory 920. Main memory 920 stores, in part, instructions and data for execution by processor unit 910. Main memory 920 can store the executable code when the computing system 900 is in operation. The computing system 900 of FIG. 9 may further include a mass storage device 930, portable storage medium drive(s) 940, output devices 950, user input devices 960, a display system 970, and other peripheral devices 980.

The components shown in FIG. 9 are depicted as being connected via a single bus 990. The components may be connected through one or more data transport means. Processor unit 910 and main memory 920 may be connected via a local microprocessor bus, and the mass storage device 930, peripheral device(s) 980, portable storage medium drive(s) 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 920.

Portable storage medium drive(s) 940 operate in conjunction with a portable non-volatile storage medium, such as a floppy disk, compact disk or Digital video disc, to input and output data and code to and from the computing system 900 of FIG. 9. The system software for implementing embodiments of the present invention may be stored on such a portable medium and input to the computing system 900 via the portable storage medium drive(s) 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Suitable output devices include speakers, printers, network interfaces, and monitors. Where computing system 900 is part of a mechanical client device, the output device 950 may further include servo controls for motors within the mechanical device.

Display system 970 may include a liquid crystal display (LCD) or other suitable display device. Display system 970 receives textual and graphical information, and processes the information for output to the display device.

Peripheral device(s) 980 may include any type of computer support device to add additional functionality to the computing system. Peripheral device(s) 980 may include a modem or a router.

The components contained in the computing system 900 of FIG. 9 are those typically found in computing systems that may be suitable for use with embodiments of the present invention and are intended to represent a broad category of such computer components that are well known in the art. Thus, the computing system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

In summary, the present technology relates to a method of modifying the set of one or more wakewords of a speech-enabled device, comprising: receiving, from a user, a spoken request; parsing the request into a natural language request and a speech audio segment, wherein the natural language request instructs the device to accept the speech audio segment as a new wakeword; and defining a new wakeword spotter to recognize the new wakeword as an activation trigger.

In another example, the present technology relates to a method of modifying the set of one or more wakewords of a speech-enabled device, comprising: receiving, from a user, a spoken request; parsing the request into a natural language request and a speech audio segment, wherein the natural language request instructs the device to accept the speech audio segment as a new wakeword; defining a new wakeword spotter to recognize the new wakeword as an activation trigger by: dividing the speech audio segment into successive phonetic segments, comparing parsed audio segments against a dataset of segments used to train an existing ASR algorithm to find matches between the parsed audio segments and segments in the dataset of segments, and training the spotter using the one or more matched phonetic segments from the existing ASR algorithm.

In a further example, the present technology relates to a method of modifying the set of one or more wakewords of a speech-enabled device, comprising: receiving, from a user, a spoken request; parsing the request into a natural language request and a speech audio segment, wherein the natural language request instructs the device to accept the speech audio segment as a new wakeword; defining a new wakeword spotter to recognize the new wakeword as an activation trigger by: obtaining additional speech audio samples of the speech audio segment, converting the speech audio segment and the additional speech audio samples to phoneme sequences, defining the wakeword spotter based on one or more of the phoneme sequences.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the invention as described herein.

I claim:

1. A method of modifying the set of one or more wakewords of a speech-enabled device, comprising:
   receiving, from a user, a spoken request;
   parsing the request into a natural language request and a speech audio segment, wherein the natural language request instructs the device to accept the speech audio segment as a new wakeword;
   building a new wakeword spotter to recognize the new wakeword as an activation trigger.

2. The method of claim 1, wherein the new wakeword spotter is built immediately.

3. The method of claim 1, comprising giving the user a spoken response to the natural language request, the response confirming the new wakeword, wherein the new wakeword spotter is built before the end of the spoken response.

4. The method of claim 1, wherein the spoken request is received at any time during a spoken dialog between the user and the device.

5. The method of claim 1, further comprising defining the new wakeword spotter, wherein the new wakeword spotter is built locally on the device.

6. The method of claim 1, further comprising training the new wakeword spotter, wherein the new wakeword spotter training is performed remotely on a server connected by a network to the device.

7. The method of claim 1, further comprising adding the new wakeword to an earlier wakeword set comprising at least the earlier wakeword, the wakeword spotter activating the device upon receiving a speech audio segment comprising the new wakeword or a wakeword from the earlier wakeword set.

8. The method of claim 1, further comprising replacing one or more earlier wakewords with the new wakeword, so that, going forward, the device activates upon receiving a speech audio segment that matches the new wakeword, and does not activate upon receiving a speech audio segment that matches an earlier wakeword.

9. The method of claim 8, further comprising the step of later resetting the device to the earlier wakeword, such that the wakeword spotter activates the device upon receiving a speech audio segment comprising the earlier wakeword.

10. The method of claim 8, further comprising a way to later reset the wakeword set of the device to factory settings.

11. The method of claim 1, wherein the wakeword spotter is trained based on the speech audio segment, and the training is speaker-dependent, such that the device will activate when the new wakeword is spoken by the user that created the new wakeword, but not when spoken by others.

12. The method of claim 11, further comprising generating a model of the user's voice to be used for speaker verification purposes.

13. The method of claim 1, wherein the wakeword spotter is trained based on the speech audio segment, and the training is speaker-independent, such that the device will activate when the new wakeword is spoken by the user that created the new wakeword and others that did not create the new wakeword.

14. The method of claim 1, wherein the device solicits from the user additional speech audio samples for the new wakeword, and the wakeword spotter is trained using the speech audio segment and the additional speech audio samples.

15. The method of claim 14, wherein the new wakeword spotter training is performed locally on the device.

16. The method of claim 1, wherein the step of defining a new wakeword spotter comprises the step of training the new wakeword spotter using cached spotters for at least portions of phonetic segments of the new wakeword.

17. The method of claim 1, wherein the step of defining a new wakeword spotter comprises the step of dividing the wakeword into phonetic segments and using cached spotters for at least portions of the phonetic segments.

18. The method of claim 1, wherein the step of defining a new wakeword spotter comprises the step of dividing the wakeword into phonetic segments and building spotters for the phonetic segments.

19. The method of claim 1, wherein the wakeword spotter is formed from phonetic segments streamed from a remote server and compared to phonetic segments of wakewords stored on the device.

20. A method of modifying the set of one or more wakewords of a speech-enabled device, comprising:
   receiving a spoken utterance;
   parsing the utterance into a natural language request and a speech audio segment, wherein the natural language request instructs the device to accept the speech audio segment as a new wakeword;
   using automatic speech recognition to map the wakeword to a wakeword phonetic sequence;
   building a new wakeword spotter to recognize the new wakeword phonetic sequence as an activation trigger by:
      dividing the new wakeword phonetic sequence into a sequence of two or more successive partial phonetic segments;
      for each partial phonetic segment, providing a corresponding partial wakeword spotter; and
      assembling sequentially the provided partial wakeword spotters into a wakeword spotter for the entire new wakeword phonetic sequence.

21. The method of claim 20, wherein said step of dividing the wakeword sequence into phonetic segments comprises the step of dividing the wakeword sequence into words.

22. The method of claim 20, wherein said step of dividing the wakeword sequence into phonetic segments comprises the step of dividing the wakeword sequence into separate syllables.

23. The method of claim 20, wherein said step of dividing the wakeword sequence into phonetic segments comprises the step of dividing the wakeword sequence into phonetic segments smaller than syllables.

24. The method of claim 20, wherein providing a partial wakeword spotter for a partial phonetic segment comprises:
   identifying a dataset of phonetically labeled audio segments;
   searching the dataset to collect audio segments whose phonetic label matches the partial phonetic segment, and
   training the partial wakeword spotter based on the collected audio segments.

25. The method of claim 20, wherein providing a partial wakeword spotter for a partial phonetic segment comprises:
   identifying a collection of cached wakeword spotters, indexed by wakeword;
   retrieving a cached wakeword spotter for the partial phonetic segment.

26. The method of claim 20, wherein said step of providing portions of the wakeword spotter for each of the phonetic segments comprises the steps of retrieving, from a cache of wakeword spotters, partial wakeword spotters for successive phonetic segments of the phonetic sequence, and assembling the partial wakeword spotters into the new wakeword spotter.

27. The method of claim 20, wherein said step of determining portions of the wakeword spotter for each of the phonetic segments comprises the steps of
   checking memory for a cached wakeword spotter for a phonetic segment, and
   building a wakeword spotter for the phonetic segment if the phonetic segment does not have a wakeword spotter cached in memory.

28. The method of claim 20, further comprising adding the new wakeword to an earlier wakeword set comprising at least the earlier wakeword, the wakeword spotter activating the device upon receiving a speech audio segment comprising the new wakeword or a wakeword from the earlier wakeword set.

29. A method of modifying the set of one or more wakewords of a speech-enabled device, comprising:
   receiving a spoken request;
   parsing the request into a natural language request and a speech audio segment, wherein the natural language request instructs the device to accept the speech audio segment as a new wakeword;
   defining a new wakeword spotter to recognize the new wakeword as an activation trigger by:
      determining additional speech audio samples of the speech audio segment,
      converting the speech audio segment and the additional speech audio samples to phoneme sequences,
      defining the wakeword spotter based on one or more of the phoneme sequences.

30. The method of claim 29, wherein the new wakeword is a private wakeword to a person that provided the spoken request, such that the device activates upon receiving the new wakeword from the person but not others.

31. The method of claim 29, further comprising receiving feedback from a user to verify correctness of a phoneme sequence when two or more of the phoneme sequences differ from each other.

32. The method of claim 29, further comprising adding the new wakeword to an earlier wakeword set comprising at least the earlier wakeword, the wakeword spotter activating the device upon receiving a speech audio segment comprising the new wakeword or a wakeword from the earlier wakeword set.

33. The method of claim 29, further comprising replacing an earlier wakeword with the new wakeword, such that the wakeword spotter activates the device upon receiving a speech audio segment comprising the new wakeword, and not activating the device upon receiving a speech audio segment comprising the earlier wakeword.

34. The method of claim 29, further comprising the step resetting the device to the earlier wakeword, such that the wakeword spotter activates the device upon receiving a speech audio segment comprising the earlier wakeword.

* * * * *